INVENTOR.
WILLARD J. FAULKNER
BY
J. D. Douglas
His ATTORNEY

INVENTOR.
WILLARD J. FAULKNER
BY
J. D. Douglas
His ATTORNEY

INVENTOR.
WILLARD J. FAULKNER
BY J. V. Douglas
His ATTORNEY

Feb. 14, 1967 W. J. FAULKNER 3,304,092

PHONOGRAPH RECORD CHANGER

Filed Feb. 24, 1964 9 Sheets-Sheet 4

INVENTOR.
WILLARD J. FAULKNER

BY J. D. Douglas

HIS ATTORNEY

Feb. 14, 1967 W. J. FAULKNER 3,304,092

PHONOGRAPH RECORD CHANGER

Filed Feb. 24, 1964 9 Sheets-Sheet 5

INVENTOR.

WILLARD J. FAULKNER

BY J. W. Douglas

HIS ATTORNEY

Feb. 14, 1967 W. J. FAULKNER 3,304,092

PHONOGRAPH RECORD CHANGER

Filed Feb. 24, 1964 9 Sheets-Sheet 6

INVENTOR.
WILLARD J. FAULKNER
BY
J. O. Douglas
HIS ATTORNEY

INVENTOR.
WILLARD J. FAULKNER
BY J. D. Douglas
His Attorney

INVENTOR.
WILLARD J. FAULKNER
BY
J. U. Douglas
HIS ATTORNEY

PHONOGRAPH RECORD CHANGER

Filed Feb. 24, 1964

INVENTOR.
WILLARD J. FAULKNER
BY J. D. Douglas
His ATTORNEY

United States Patent Office 3,304,092 Patented Feb. 14, 1967

3,304,092
PHONOGRAPH RECORD CHANGER
Willard J. Faulkner, 621 Linden, Glen Ellen, Ill. 60137
Filed Feb. 24, 1964, Ser. No. 346,602
28 Claims. (Cl. 274—10)

This invention relates to phonograph record changers and more particularly to one upon which records of different sizes may be manipulated.

More particularly it relates to a changer where the records are stacked on a center post having a shoulder upon which the records rest, and which are moved off of the center post one at a time to fall on the turntable where they are played. A stabilizer or hold down arm engages the top record of the stack and keeps them from falling off prematurely.

During each change cycle the tone arm is lifted off of the played record, moved out to one side of the stack and returned to contact the record on the bottom of the stack, to determine the size of record, then moved outward to allow the record to be dropped and then returned to playing position and lowered onto the record just dropped.

The records are dislodged one at a time from the shoulder on the center post by a lever disposed in the center post after the manner described in Patent No. 2,291,158 to Holstensson et al. After the last record is released, the stabilizer arm initiates movement of a mechanism to automatically shut the changer off after the last record is played.

One of the features of the present invention is a center post of the type stated which is quickly and easily removable to enable an adapter to be used to handle 45 r.p.m. records having a large center hole, and to enable it to be removed for shipping purposes and thus reduce the overall height of the same.

Another feature resides in an improved mounting for the tone arm which reduces friction to a minimum and enables a much lighter needle or stylus pressure to be realized, thus extending the life of the records.

Another feature of the tone arm resides in the fact that the mounting is such that interference with the tone arm during a record change cycle does not cause misadjustment or breakage thereof.

Another feature of the invention resides in an improved mechanism for starting the record change cycle which operates with a minimum of inertia and effort, enabling a much lighter needle pressure.

Another feature resides in the improved speed control mechanism which is simple and economical in construction.

Another feature of the invention resides in the ability to perform all adjustments from the top of the changer. This is facilitated by the fact that the tone arm and stabilizer arm may be removed as a unit, along with a top portion of the base, including the cover for the speed shift, to make the various parts readily accessible.

The design and construction is such that during manufacture all parts may be assembled from the top and it does not need to be turned over for assembly purposes. In addition, it lends itself to the use of plastic or nonmetallic materials which are more economical, easier to manufacture and electrically are more desirable because they reduce or eliminate the generation and effects of stray inductive or magnetic fields.

Still other advantages of the invention and the invention itself will become more apparent from the following description of an embodiment thereof, which is illustrated by the accompanying drawings and forms a part of this specification.

Figure 26:
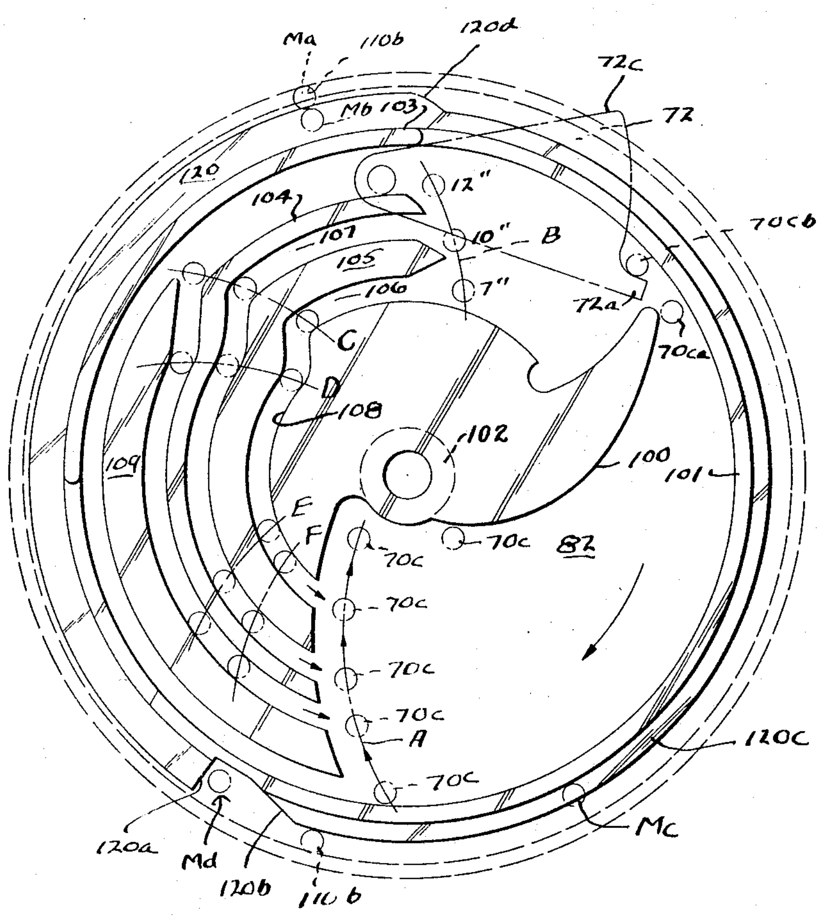
Figures 16, 17, 26A:
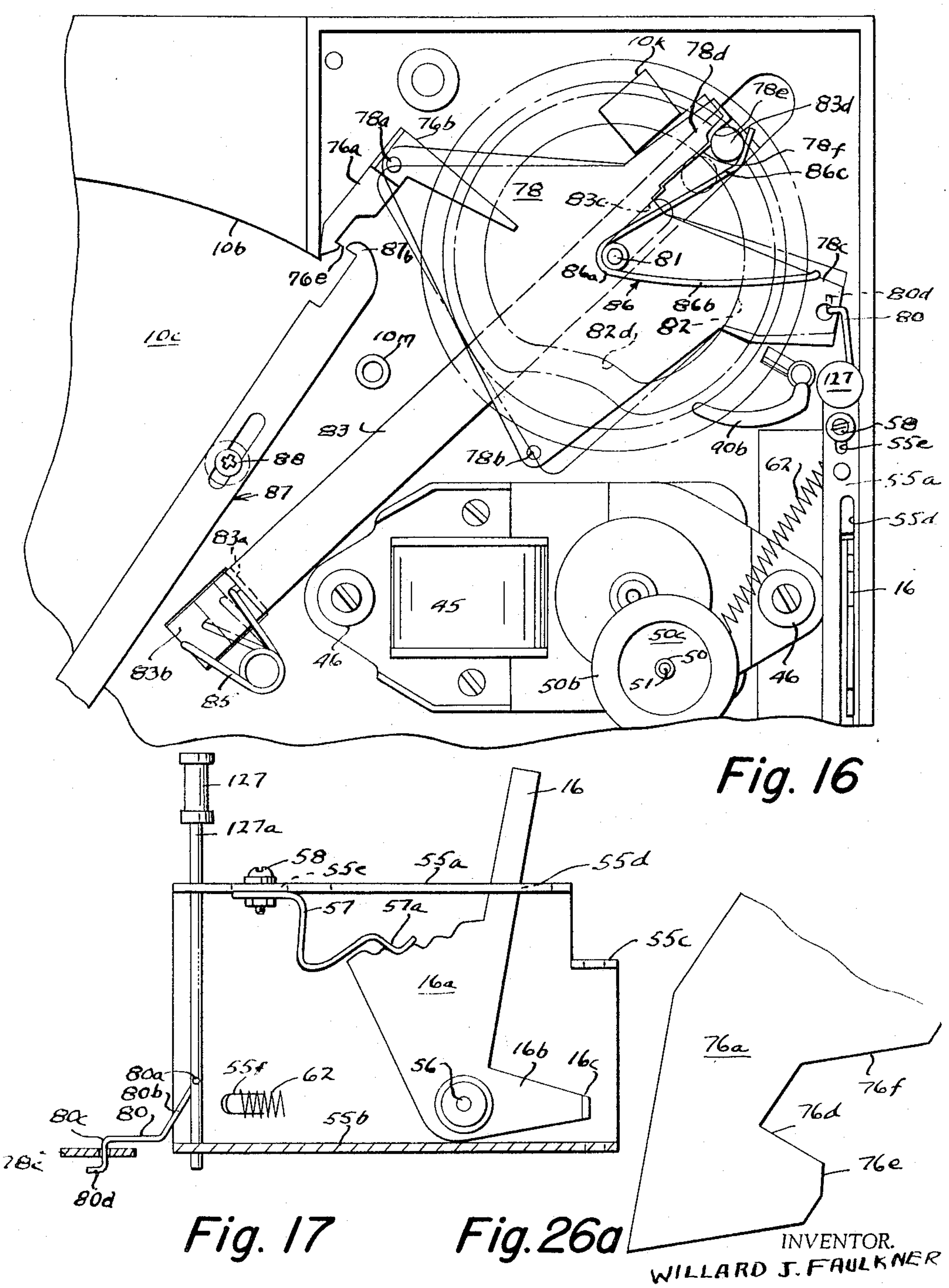
FIG. 16 is a view similar to FIG. 8 with the cam gear removed and with an alternate position of the cam gear support plate shown in dashed lines and the bottom of the cam gear shown in dashed lines.
FIG. 17 is a side elevational view of the speed shift lever control means and record ejector and the support bracket therefor.
Figures 18, 18A, 18B, 19, 20, 21, 21A:
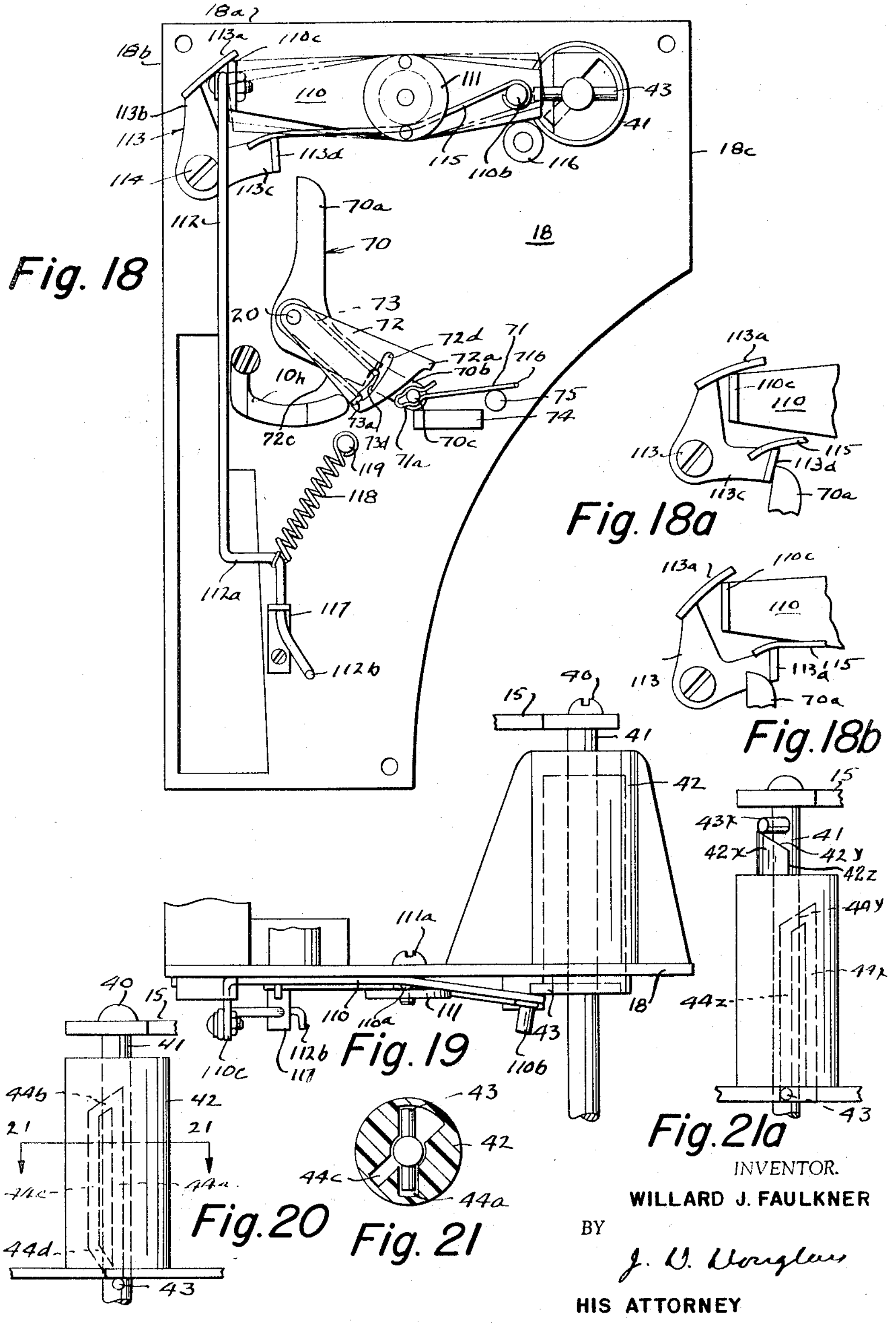
FIG. 18 is a bottom plan view of the removable tone arm, stabilizer and speed shift cover or plate showing the last record shut off mechanism and the mechanism cooperating with the cam gear.
Figures 22, 24, 25:
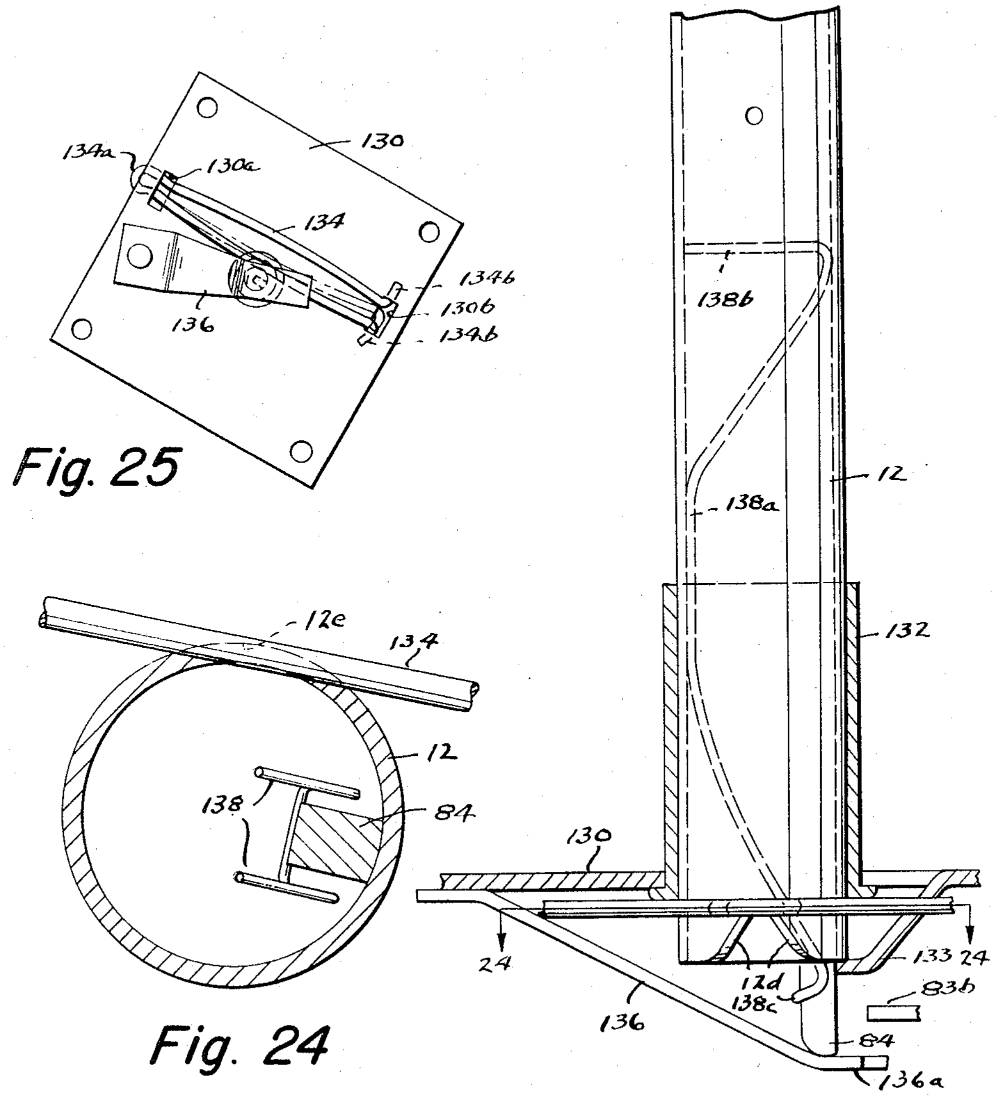
Figure 23:
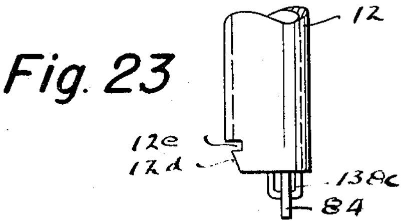

FIGS. 18*a* and 18*b* are fragmentary views of alternate positions of the mechanism of FIG. 18;

FIG. 19 is a fragmentary elevational view of the record stabilizer support post and the last record shut off;

FIG. 20 is a similar view of the stabilizer support arm post rotated 45° with interior cam grooves shown in dotted lines;

FIG. 21 is a section on the line 21—21 of FIG. 20;

FIG. 21*a* is an alternate form of the stabilizer swing-out mechanism of FIG. 20;

FIG. 22 is an enlarged fragmentary view of the lower portion of the record releasing and supporting spindle and its associated parts;

FIG. 23 is a fragmentary view of the lower part rotated 90°;

FIG. 24 is a section on the line 24—24 of FIG. 22;

FIG. 25 is a bottom plan view of the spindle support plate and its associated parts removed;

FIG. 26 is a top plan view of the cam gear with the various positions taken by the followers during certain phases of the record change cycle; and FIG. 26*a* is an enlarged fragmentary view of the end of the trip hook.

Figures 1, 2:
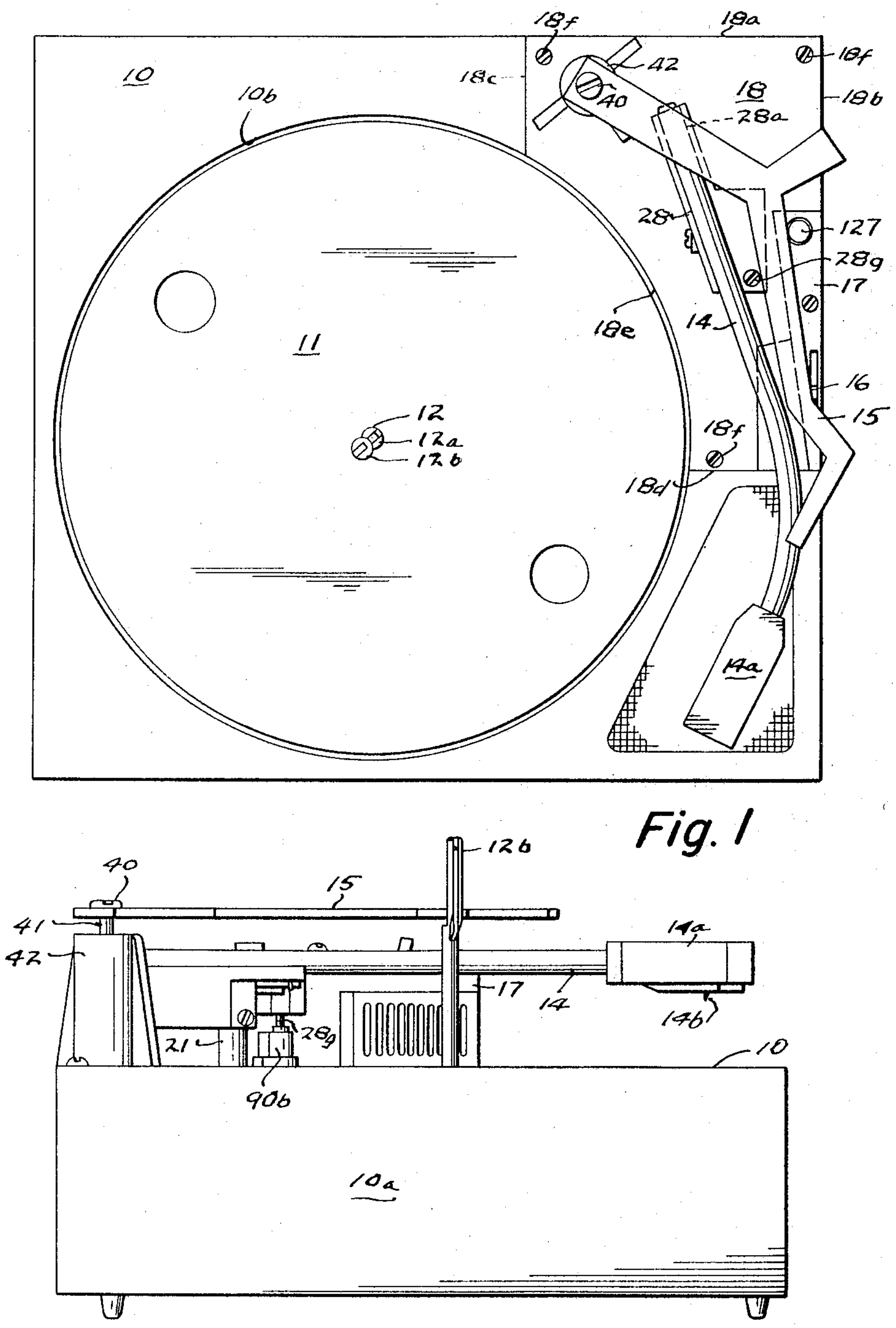
FIG. 1 is a plan view of a record changer of this invention, with the mechanism in an "off" position.
FIG. 2 is a side elevational view of the record changer of FIG. 1.
Figures 3, 4, 5:
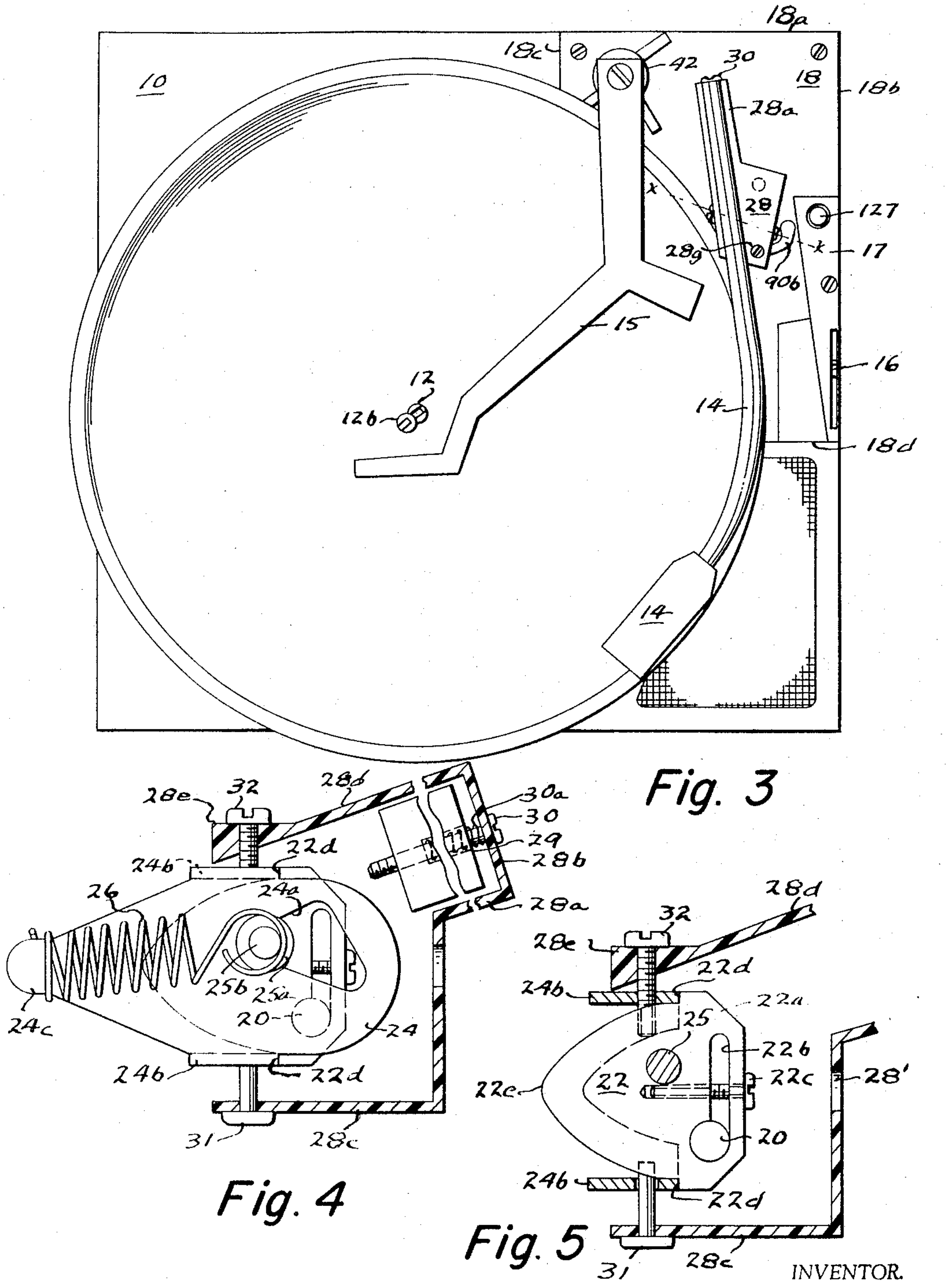
FIG. 3 is a plan view with the mechanism in the "on" position at the start of the playing of a record.
FIG. 4 is an enlarged fragmentary plan view of the tone arm top support with the tone arm shown broken away and shown in fragment.
FIG. 5 is a similar plan view of the tone arm base support.

Referring now to the drawings, throughout which like parts have been designated by like reference characters, and more particularly as can best be seen from FIGS. 1 to 3 inclusive, exteriorly the changer is depicted as including a base having an upper surface 10 and downwardly extending side walls **10*a*. The upper side is provided with a downwardly extending circular well 10***b* in which a turntable 11 is disposed. A spindle 12 extends upwardly from the center of the turntable, and has the usual offset record stack holding part 12*b* and a record supporting shoulder 12*a*.

On the top of the base and to one side of the turntable, there is provided a removable cover plate housing 18, the adjacent edges 18*a*–18*b* of which define the upper right corner and the edges 18*c* and 18*d* the two extremities and which extremities are joined together by a curved edge 18*e* which follows the contour of the turntable 11. The base is held in position by screws 18*f* which extend through the plate and are threaded into bosses, not shown, on the side walls 10*a*. A tone arm 14 and adjacent thereto a record stabilizer and hold down arm 15 are swingably mounted on the plate 18. The tone arm is provided with the usual pickup head 14*a* having a needle 14*b* for tracking the record groove.

At the extreme edge of the base plate 18 is the motor speed control lever 16, which extends upward through a housing 17 extending vertically upward from the base of the plate.

The stabilizer arm is movable from the position shown in FIG. 1 to that of FIG. 3, where it rests on the top of the stack of records supported on the shoulder 12*b* of the spindle to stabilize the records and prevent them from accidentally or prematurely falling off.

The cover plate and housing, along with the tone and stabilizer arms is removable from the base as a unit to expose the cooperating components immediately below the plate. When the plate 18 is removed, the tone arm control lever and its associated parts along with the stabilizer arm and the part associated therewith, for shutting off the changer after the last record is played, are removed along with the plate.

When the plate is replaced the underneath parts engage with the mechanism disposed on the base below the plate which causes the cycling of the tone arm and the shutting off of the record changer after the last record is played.

The tone arm is supported near its base for the usual swinging and up and down movement of the pickup by a support means which is of a character that reduces the friction to a minimum and enables an extremely light pressure to be applied by the needle to the record and still enable good reproduction and permit the run out groove of the record to move the arm quickly to initiate the record change cycle. As will later more clearly appear, the trip mechanism operates with a minimum of effort, thus enabling the light pressure mentioned above to be realized.

The tone arm support includes a shaft 20, FIGS. 4, 5 and 18, which extends down through a bushing or post 21, FIG. 2, on top of the cover plate and through and below the cover plate. The lower end of the shaft carries a control lever which cooperates with a cam to rotate the shaft for controlling the outward and inward swinging movement of the tone arm later more specifically described. The upper end of the shaft is gripped by a clamp means 22, FIG. 5, which may be made of a suitable plastic and includes a base 22*a* having a keyhole shaped slot 22*b* extending transversely across the base and a clamping screw 22*c*. The clamping screw 22*c* extends loosely through a hole extending between the slot and the edge of the base and is threaded into the body of the base. The screw may be loosened to adjust the base to the desired height and rotational position on the shaft and then clamped by tightening the screw. It is easily reached through an opening 28' in the rear of the tone arm housing, FIG. 4.

Spaced from the base on opposite sides are shoulders 22*d*, and, from the shoulders, the base curves on each side to the apex 22*e*.

A hinge and safety plate 24 is mounted on the base and is so connected to the base that it may be moved manually relative to the base. A headed pin is secured in the base and includes a stem 25 and a head or flange 25*a* which extends above the base in spaced relation thereto. The hinge plate has a triangular opening 24*a* therein through which the headed pin 25 extends with the head overhanging the plate at the edge of the opening. The plate has a pair of downwardly extending flanges 24*b* on opposite sides and which extend down on opposite sides of the base and with the rear edges engaged with the shoulders 22*d* on the base. The plate with the flanges is held against the shoulders by a coil spring 26, one end of which is hooked on an extension 25*b* of the pin 25, which extends above the head 25*a*, and the other end of which is looped over an extension 24*c* of the hinge plate. The tension on the spring causes the flanges 24*b* to be pulled into engagement with the shoulders, the stem of the holding pin 25 being in one of the corners of the opening 24*a*. It will be apparent that the hinge plate may be moved laterally and that one or the other of the flanges 24*b* can rock on the corresponding shoulder 22*d*. The curvature of the base edges from the base to the apex is such that either one of the flanges may move along the arcs defined by the surface leading to the apex. At the same time the shape of the triangular opening 24*a* in the hinge plate is such that when the above rocking movement occurs it allows the plate to move about the pin shank 25 but with the head 25*a* always overhanging the plate adjacent the edges of the opening and preventing the plate from being dislodged from the base. This is the means whereby any interference with the tone arm during the change cycle enables the hinge plate to move relative to the base and prevents damage to the mechanism.

The flanges 24*b* on the support plate also provide the support for the tone arm body housing. As best shown in FIGS. 1 and 3, the body housing 28 includes a rear narrow part 28*a* which houses and guides a counterweight 29. A cross section of the part 28*a* is of inverted U shape. Between the depending parallel walls the counterweight 29 is supported on an adjusting screw 30, a spring 30*a* being disposed between the end wall 28*b* and the weight, around the screw shank. The weight can be moved longitudinally between the walls of the body to counterbalance and adjust for the weight of the pickup and hence the pressure exerted by the needle at the end of the tone arm.

The top of the housing 28 may be provided with a longitudinally extending seat, not shown, and the tone arm 14 is rigidly secured to the body 28*a* in the seat in any suitable manner such as by screws, not shown, extending into the tone arm from the underside of the housing. The hinging for the body is well ahead of the extremity of the part 28*a* in the main housing 28, which main housing is of an irregular trapezoidal shape.

As best shown in FIGS. 4 and 5, the side walls 28*c* and 28*d* of the main housing body extend down on opposite sides of the flanges 24*b* of the hinge plate. One wall 28*c* carries a headed pin 31 which has a press fit with an opening in the housing and extends freely through a hole in one of the flanges 24*b*. The hole clearance should allow easy movement of the pin but should not allow undue lateral movement in the opening. The other wall of the housing is provided with a boss 28*e* which has an outer surface parallel to the other wall and into which a hinge screw 32 is threaded. The shank of the screw has a close fit with the housing and is in loose threaded engagement with an opening in the other flange 24*b*. When the body is assembled with the hinge plate, the spacing between the flanges of the hinge plate and the walls of the housing may be determined by holding the housing centered relative to the plate and then threading the screw 32 through the housing and into the flange 24*b*. The housing is free to pivot about the screw 32 and the pin 31, so that the tone arm may move vertically, but it cannot move laterally relative to the plate because of the threaded engagement of the screw. Thus accurate vertical hinging is obtained with a minimum of friction. The pin 31 could also be a screw the same as screw 32, if desired.

As can best be seen from FIG. 3, the pivot line for the tone arm is on the line $x$—$x$ and this line is well ahead of the rear end of the tone arm. Exact counter-balancing of the tone arm with its pickup may be obtained by shifting the weight 29. Thus a needle or stylus pressure of as low as one-half gram may be obtained and the pickup arm is still able to follow any undulations that may be in the record.

As previously stated, the stabilizer arm 15 may be swung from the position shown in FIG. 1, at the side of the turntable to a position over the turntable adjacent the spindle where it rests on the uppermost record of a stack of records disposed on the offset portion and shoulder, to prevent the records from accidentally falling off of the shoulder. The arm is capable of being moved vertically and is gradually lowered as the records are discharged. The arm is manually moved from the lowered position at one side of the turntable as shown in FIG. 1 to the position shown in FIG. 3 over the turntable and near the spindle, by raising the arm bodily to the limit of its upward travel, after which it is swung over into the position of FIG. 2 and lowered onto the stack of records. In this position it is held in place until the last record is released, at which time the arm falls by gravity to a lower position and at the same time automatically moves back to the outer position. In its lowered outer position it cooperates with means below the base part 18 to automatically cause the record changer to be shut off after the last record is played.

As best shown in FIGS. 19 to 21 inclusive, the stabilizer arm 15 is secured by a screw 40 to a shaft 41 reciprocably and rotatably mounted in a pedestal 42.

The shaft 41 is provided with a guide pin 43 disposed spaced from the top and extending through the shaft and outwardly on both sides. The guide pin performs several functions. It cooperates with guide surfaces within the pedestal to guide the arm in its upward and downward movement. It also cooperates to cause the arm to be swung outward when the last record is released. It also engages the last record shut-off mechanism secured on the underside of the base portion 18 to activate or set up that mechanism when the arm is swung out and down to cause the record changer to be shut off on the subsequent change cycle after the last record has been played.

As best shown in FIG. 20, the interior bore of the pedestal is provided with a guideway which comprises a vertically extending channel 44*a* in which the pin 43 is guided when the arm is moved upward from the lowered position shown in FIG. 1. At the top 44*b* the channel extends lateraly and slants downwardly. When the arm is moved slightly to the left and released, it swings toward the center post automatically. Then the channel extends down at 44*c* which enables the arm to be lowered onto a record, and guides it in its downward movement. The channel 44*c* is somewhat shorter than the channel 44*a* and the lower end is connected by a cam guideway 44*d* with the bottom of channel 44*a*.

The lower end of the channel 44*c* is so dimensioned that when the stabilizer arm rests on the last record of the stack the pin 43 is approximately at the intersection of the channels 44*c* and 44*d*. When the last record is discharged the pin 43 rides in the cam channel 44*d* and the arm is automatically swung to its outer position. At this time the pin is moved, by the outward swinging movement, over the last record shut-off lever carried under the plate to tilt that lever about its pivot, as will later be described.

As previously stated, the extreme right edge of the plate 18 has an upwardly extending housing through which the speed control lever 16 extends. In addition, the "reject" button 127 also projects above this housing.

Figure 8:
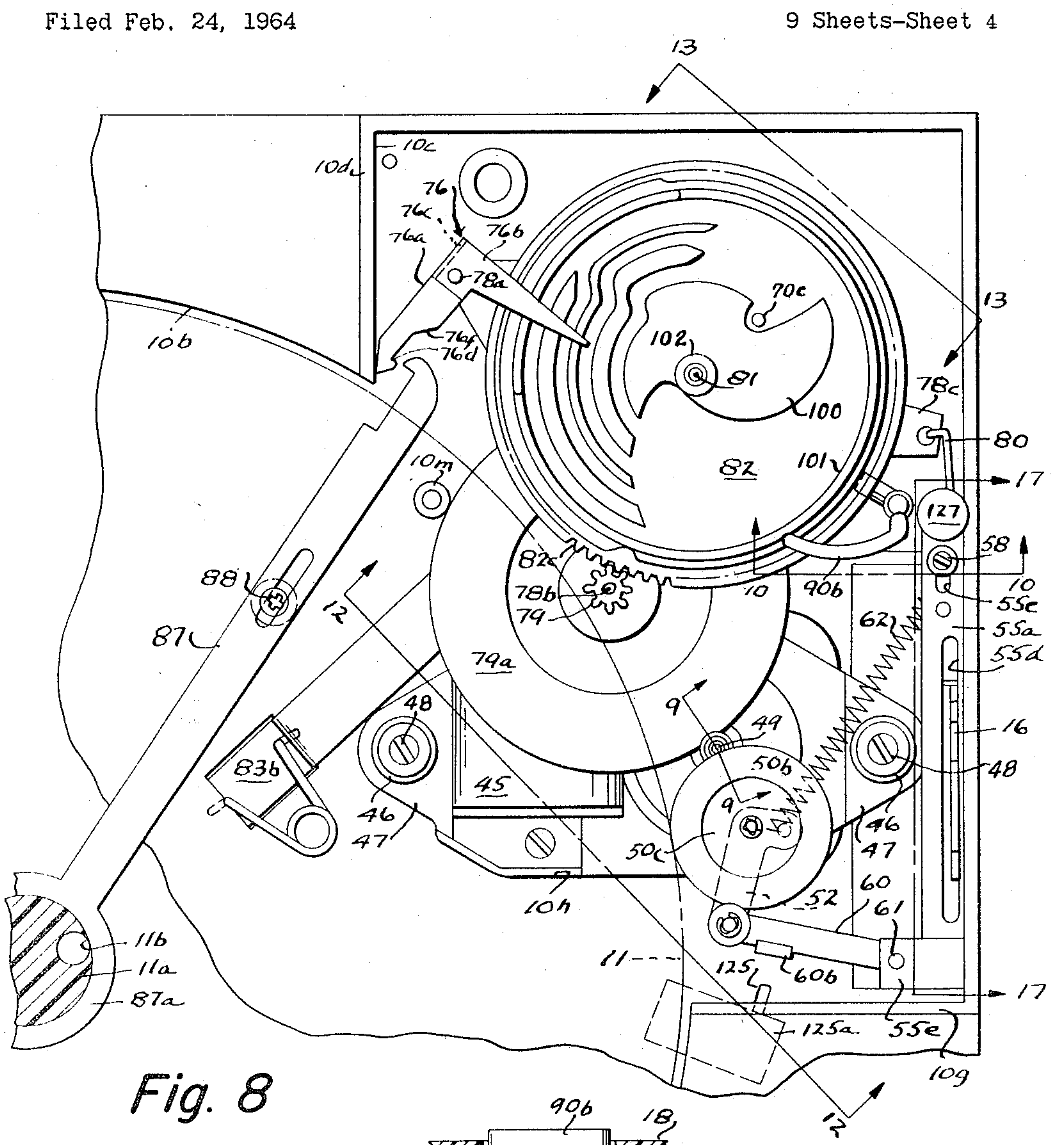
FIG. 8 is an enlarged fragmentary plan view of the cycling mechanism, the turntable, pickup arm and stabilizer assembly together with their support plate having been removed.

As can best be seen from FIG. 8, the circular well 10*b* in which the turntable is disposed connects or intersects with a rectangular well 10*c* which has peripheral ledges 10*d* and 10*g* upon which the respective edges 18*c* and 18*d* of the plate 18 rest. The two adjacent edges 18*a* and 18*b* rest on top of the side walls which meet to form the upper righthand corner.

Figure 6:
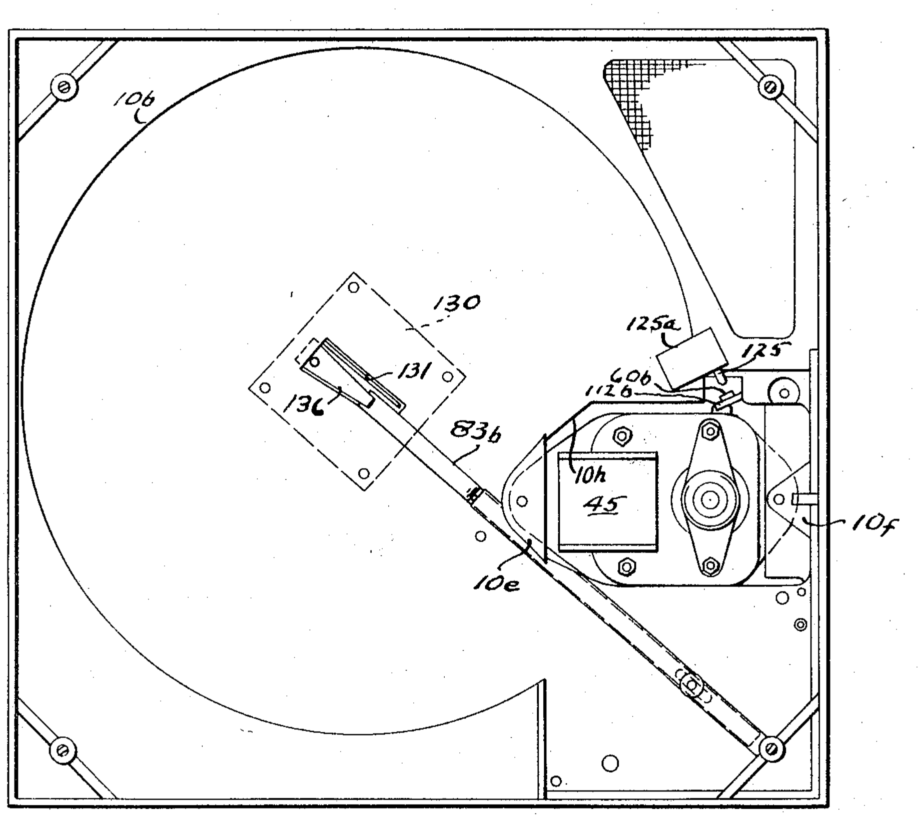
FIG. 6 is a bottom plan view of the record changer.

The bottoms of the wells 10*b* and 10*c* are coextensive. As best shown in FIG. 6, the bottom is provided with a motor aperture 10*h* having supports 10*e* and 10*f* at opposite ends on which a motor 45 is resiliently mounted.

It should be noted that this mounting is highly resilient due to the fact that the motor is suspended on resilient grommets 46 disposed in the motor brackets 47 (FIG. 8) with screws 48 extending through the grommets and threaded into the supports 10*e* and 10*f*. The motor may therefore tilt in the grommets which allows the motor shaft 49 to tilt.

The motor shaft is a stepped shaft arranged to drive the turntable at speeds of 16, 33⅓, 45 and 78 r.p.m. To this end the motor shaft is provided with a first cylindrical surface 49*a* which is used to drive the cycle changing mechanism and spaced above this is a large surface 49*b* for providing the 78 r.p.m. speed (this is actually 78.26 r.p.m.) and upwardly therefrom surfaces 49*c*, 49*d* and 49*e* for providing the speed of 45, 33⅓ and 16 r.p.m. respectively.

The drive to the turntable is effected by a flexible idler wheel which engages with the steps of the motor shaft and with the periphery of the turntable 11, FIG. 8. The idler wheel FIG. 16 includes a hub 50 which is rotatably mounted on a pin 51 that is carried by an arm 52. The rim 50*b* of the idler is of flexible material such as rubber or synthetic rubber supported by a center portion 50*c* of a higher durometer test. Due to the flexibility of the rim and the flexible mounting of the motor, the idler can be moved in either direction to any of the steps 49*b*, 49*c*, 49*d* and 49*e* without withdrawing the idler wheel from contact with the shaft and this action is facilitated when the motor is running.

Figure 12:
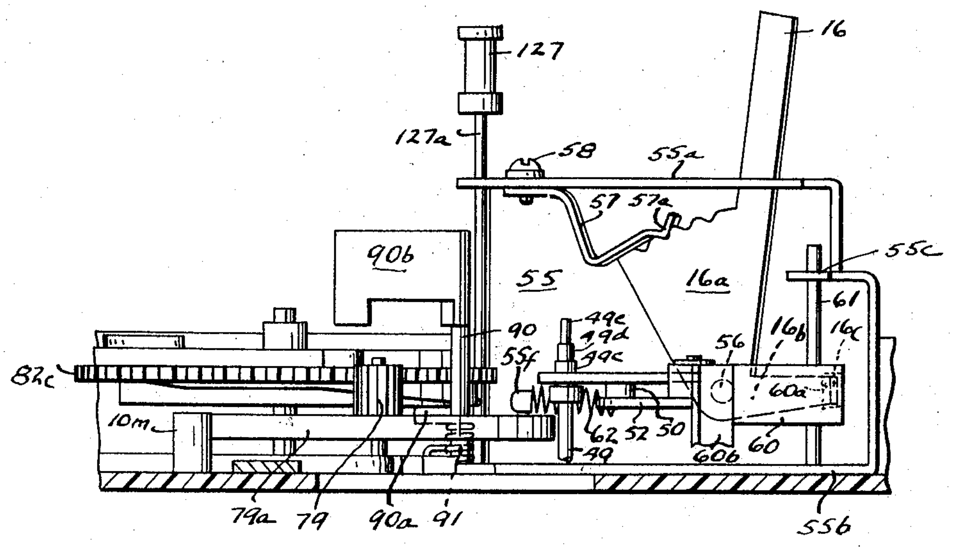
FIG. 12 is a view taken from the line 12—12 of FIG. 8 illustrating the speed shift, turntable drive and record change cycle mechanism.

The means for shifting the idler is shown in FIGS. 8, 12 and 17.

A speed shift lever bracket is secured at the right side of the base and extends upwardly from the bottom wall 10*c*. It includes a vertical wall 55, a top flange 55*a*, a bottom flange 55*b* and at one end and stepped down from the top flange a narrow idler support flange 55*c*. A speed shift lever, the operating handle 16 of which extends upward through a slot 55*d* in the flange 55*a* has a body 16*a* pivotally secured to the vertical wall 55 and 56. The upper edge of the lever is formed with a plurality of V shaped notches any one of which may be engaged by the detent end 57*a* of a spring detent 57 which is secured by an adjustable screw 58 to the underside of the flange 55*a*. The screw extends through a slot 55*e*. Extending from the side of the lever is a bell crank arm 16*b* having an outwardly extending lug 16*c*.

As best shown in FIG. 12, a first idler support arm 60 is pivotally mounted by a vertical rod 61 which extends between the bracket 55*c* and the lower flange 55*b*. The end of the arm 60 is notched at 60*a* and the lug 16*c* extends into the notch. When the lever 16*a* is moved about its pivot by the arm 16, the lug 16*c* raises and lowers the support arm 60. The adjustable detent enables the lever to be placed to the exact position for raising and lowering the idler wheel 50*b* for engagement with any of the top four speed steps on the motor shaft.

The arm 52 is pivotally connected to the support arm 60 and has an angular end which is connected by a spring 62 to a lug 55*f* on the bracket wall, to thus pull the wheel toward the motor shaft and turntable. Extending downwardly from the idler support arm 60 is a lug 60*b* which is engaged by a rod, later to be described, to move the idler wheel out of contact with the motor shaft when the record changer is shut off. This prevents the idler wheel from taking a set when the changer is shut off because of the pressure of the wheel against the shaft when the motor is still warm and the device is not in use. It is therefore apparent that the speed shifting is accomplished with a very simple mechanism with a minimum number of parts.

The record change cycle is effected by the needle on the pickup engaging with the run-out groove at the center of the record, which may be of the eccentric or the spiral type. It is effected by a trip link actuator on the lower end of the tone arm shaft which operates a trip link and this in turn is operated by a power link to move a cam wheel into engagement with the motor shaft. The structure is such that the resistance to tripping is extremely small, thus allowing very light pressure from the needle on the record.

On the lower end of the tone arm shaft 20, FIG. 18, there is fixedly secured a tone arm cam lever 70 of generally bell crank formation and having a pair of arms one of which is a cam follower arm **70*b* and the other a lock arm 70*a*. The arm 70*b* has a cam follower pin 70*c*** extending downward from the arm and arranged to be engaged by the record change cycle cam later described.

The pin 70 also has a head that projects above the lever and a trip spring 71 of very light spring wire mounted under the head above the lever. The spring has a body **71*a* shaped in the form of a clip which frictionally engages with the pin under the head and although there is sufficient friction to hold it in position it can move to different positions when light pressure is applied to it. It is provided with a downwardly extending trip engaging end 71*b***.

A second lever 72, about which more will be described later, is pivotally mounted on the shaft 20 below the lever 70 and is connected to the arm **70*b* by a resilient lost motion connection. It is provided with a projection 72*a* on the end which engages with the follower pin 70*c* and is normally resiliently held with the projection toward the pin by a spring 73, one end of which has an offset 73*a* hooked in the end of a slot 72*d* and the other end in the end of a slot 73*d* in the cam follower arm 70*b*, the bight of the body being disposed around the shaft 20**.

The lever 70, FIG. 18, is shown as when the tone arm is in an outward position as shown in FIG. 1. At this time the end of the arm **70*b* is in engagement with a stop 74 in the form of a lug extending downward from the underside of the plate 18. A second stop 75 is in the path of the spring 71 and on the outward movement of the tone arm the lever arm 70*b* is moved to the position shown which positions the trip spring to the exact position for its subsequent engagement with the trip which initiates the record change cycle. As the tone arm moves inward, because of the needle tracking a groove in a record, the movement of the lever 70 is in a counterclockwise direction as viewed in FIG. 18 from the position shown, and it carries with it the trip spring 71 which is now set in the exact position for the end 71*b* to engage the trip lever 76, FIG. 16. When the plate 18 is on the base, the movement of the end 71*b*** is in a clockwise direction as viewed from above.

The trip lever includes a lower hook arm **76*a* and an upper trip arm 76*b* held in spaced angular relation one above the other, by a web 76*c*. The upper and lower arms 76*b* and 76*a* are provided with aligned holes which enable the trip to be pivotally journalled on an upwardly extending pin 78*a* carried by a gear support plate 78**.

The gear support plate, FIG. 16, is of generally triangular or star formation. The left corner end of the plate has the upstanding pin **78*a* on which the trip is mounted. The adjacent corner has a pin 78*b* on which the drive pinion 79 is mounted and the other corner has an arm 78*c* in which an eject rod 80 is connected. The plate is mounted on a pivot pin 81 which is carried on the base and is also the axis for the change cycle cam gear 82 which is rotatably mounted on the pin 81** above the plate.

The base side of the plate is provided with a detent arm **78*d* which extends at an angle and has a cam surface including a rise 78*e* and a dwell 78*f*** extending from a point spaced away from the end.

There are two cam surfaces on the bottom side of the cam gear 82 which perform two separate but interrelated functions. One cam surface raises the tone arm off of the record and another cam surface operates an ejector slide which in turn operates the record ejector lever that is pivoted in the spindle.

The gear support plate 78 is movable to two positions, one in which the drive is disconnected and the cam is stationary while a record is being played, and the other, wherein the cam is driven from the motor for one complete revolution. The first stationary position is depicted in FIG. 16. The means for holding it in these two positions includes the ejector slide 83 which is also operated by the cam to move the lever in the spindle and shove a record off of the spindle shoulder.

The slide 83 is an elongated bar slidably mounted in an elongated recess in the base and having a downwardly extending part **83*a* which extends through an aperture in the base 10*b* and has an offset end portion 83*b* extending under the base opposite to and arranged to contact with the end 84 of the ejector lever, FIG. 22. It is resiliently held away from the ejector lever and in its outermost position by a spring 85, one leg of which engages with a wall of the opening in the base and the other leg with the shoulder on the slide formed by the offset. Near its outer end it is provided with an elongated slot 83*c* which enables it to be disposed over the cam gear support post 81 under the gear support. Near the end the slide has a cam follower pin 83*d* which engages with the detent arm 78*d* of the gear support plate 78**.

The gear support plate is resiliently urged in a clockwise direction and at the same time the pin **83*d* on the slide is held in contact with the detent by a spring 86 which has a bight portion 86*a* engaged with the gear support post and one arm 86*b* extending out and hooked around the right arm 78*c* of the gear plate adjacent the reject link 80, and the other arm 86*c* extending into contact with the pin 83*d*** on the slide.

Figure 14:
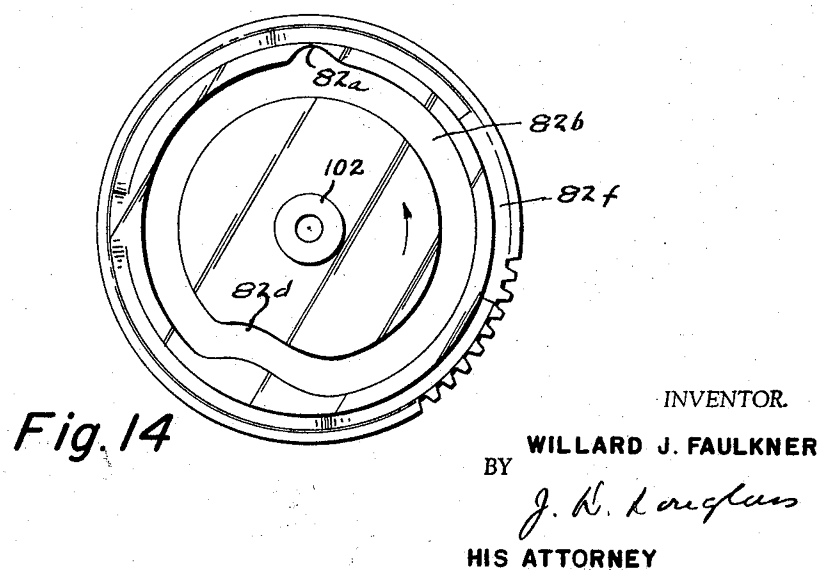
FIG. 14 is a bottom plan view thereof.

At the same time the pin **83*d* is held in the stop notch 82*a* in the ejector slide operating track 82*b*, FIG. 14. Thus there are several coordinated forces which include the spring 85 which is forcing the slide 83 outward with the cam gear pin 83*d* seated in the notch 82*a* in the cam gear and the force of the spring 86 on the gear support plate which is holding the detent arm and the pin 83*d* in contact with each other in the rise 78*e*** on the detent arm.

Figure 7:
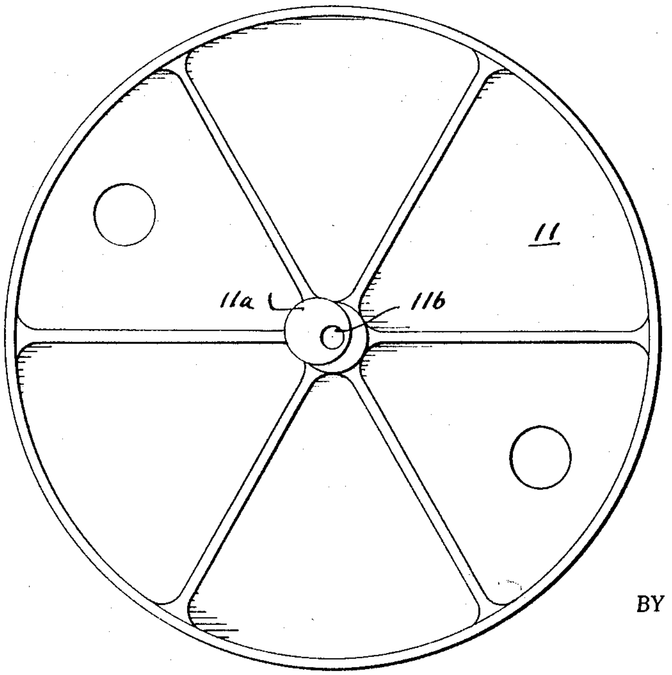
FIG. 7 is a bottom plan view of the turntable.

The turntable 11 FIGS. 7 and 8 is provided with a circular boss **11*a* the periphery of which is eccentric to the journal opening 11*b*. A pitman 87 has a ring end 87*a* rotatably engaged with the eccentric boss 11*a*. The eccentric on the turntable operates the pitman, the free end of which partakes of an oscillatory motion in an eliptical orbit due to the fact that the other end is swung in an orbit by the eccentric and the intermediate portion is held against lateral movement but may slide and pivot about a holding pin 88 on the base 10*c*** which extends through a slot in the shank of the pitman.

Thus the end of the pitman, during each rotation of the turntable, moves in a counter-clockwise eliptical orbit, first away from and outward of the hook shaped end of the trip, on its forward stroke and then backward and inward of the hook end of the trip on its rearward stroke.

The hook end of the trip lever 76 is formed with an outer cam surface **76*e* and the inner hook surface 76*d*. The trip is moved by the end 71*b* of the trip spring 71, which engages with the trip arm 76*b* when the needle is tracking a groove in the record. The pivotal movement of the trip is so slow however due to the fine pitch of the sound groove on the record that the hook end 87*b* of the trip link, on its backward movement, strikes the cam surface 76*e* a glancing blow, which moves the trip link back to its original position. However, when the needle on the tone arm reaches the high pitch center run-out groove of a record, then the trip spring moves the trip sufficiently far counter-clockwise that on the return movement of the pitman hook, the hook on the pitman engages with the hook seat 76***d* on the trip and further backward movement of the trip link pulls the trip and along with it the gear support plate, which is moved counter-clockwise to the position shown in dashed lines in FIG. 16. The movement of the support plate is limited by the detent arm 78*d* engaging wih an abutment 10*k* extending upward from the base at one side of the arm and prevents overtravel of the plate.

Figure 9:
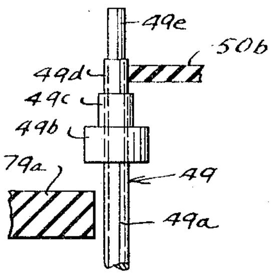
FIG. 9 is a fragmentary section taken on the line 9—9 of FIG. 8 and showing the motor shaft and idler wheels.

The cam gear 82, FIG. 8, is provided with gear teeth 82*c* around its periphery and these are in mesh with the teeth in drive pinion 79 which is rotatably mounted on the pin 78*b* at the apex of the gear support plate. The pinion gear is a part of a rubber rimmed wheel 79*a* which is normally in slightly spaced relation to the bottom portion 49*a* on the motor shaft. See FIGS. 9 and 12.

When the tone arm reaches the "run out" groove of a record and the trip link hooks onto the trip the backward movement of the pitman trip link causes the gear support to be moved and the movement of the plate causes the idler wheel to engage with the motor shaft and the cam gear starts to revolve. The cam gear track 82*b* first causes a small movement of the slide toward the spindle when the pin 83*d* is moved out of the notch 82*a* in the track. At the same time the pin engages with the wider dwell portion 78*f* of the detent arm and holds the plate in the idler gear engaged position. As the gear rotates, the "eject" rise part 82*d* of the track moves the pin, at which time the slide is forced toward the spindle with the end of the part 83*b* of the slide engaging and operating the spindle lever 84 to dislodge the record from the spindle shoulder. Continued movement of the cam gear causes the pin 83*d* and slide to be moved back to the second dwell on the cam. The cycle continues until the end is reached, at which time the pin 83*d* enters into the notch in the cam track and at the same time allows the detent arm 78*d* to be moved by the cam plate spring 86*b* to move the cam support plate back to its original position where the idler wheel is out of contact with the motor shaft.

It should be noted that when the gear support plate was moved, it carried with it the trip lever 76 and this changed position of the trip so that the orbital movement of the hook end 87*b* of the pitman, being rounded, engages with a cam surface 76*f* and moved the trip outward, each cycle of the pitman, preventing it from hooking the trip.

The stopping of the gear is sudden and there is no override, due to the engagement of the pin 83*d* in the notch 82*a* and also due to the fact that the idler wheel engages with a post 10*m* FIG. 8, extending upward from the base 10*c*.

After the change cycle started, the next thing that happened was the raising of the tone arm. As previously stated, the cam gear has two cam surfaces on the bottom, the first of which has been described. The second cam surface 82*f* is outward of the track adjacent the edge of the gear; it controls the raising and lowering of the tone arm.

Figure 10:
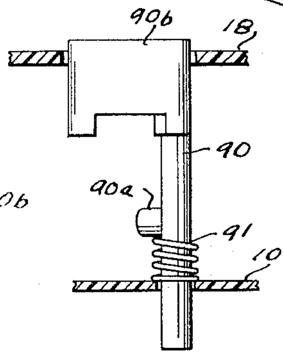
FIG. 10 is a fragmentary section on the line 10—10 of FIG. 8, showing the tone arm lifter in elevation.
Figure 11:
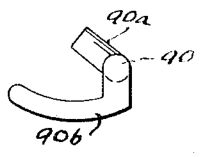
FIG. 11 is a plan view of the tone arm lifter.

The tone arm lifter, FIGS. 10 and 11, is provided for cooperation with the lifter cam surface and it in turn engages with the tone arm. It includes a stem 90 having its lower end mounted in a hole in the base 10*c* and has a laterally extending cam engaging arm 90*a* which is spaced upward from the end of the lifter held against the cam surface 82*f* by a helical spring 91 disposed between the arm and the base. The upper end of the lifter has a laterally extending arcuate tone arm engaging arm 90*b* of appreciable height which extends through a complementary slot 10*n* on the base 18 directly under the tone arm. The curvature of this arm is on a radius which is the same as that through which the height adjusting screw 28*g* of tone arm travels and this screw rests on the top of this arm except when the arm is finally lowered to playing position on a record. During the playing of a record, the lifter is held depressed by the cam. As soon as the change cycle starts, the arm 90*a* moves up on a dwell by virtue of the spring. This raises the arcuate arm under the tone arm and it in turn raises the tone arm.

Because the lifter 90 is moved up by the spring 91 there is thus incorporated a safety feature in that if downward pressure should be placed on the tone arm at any time when the lifter arm 90*b* is in contact with the tone arm, the spring 91 compresses and allows the tone arm to be depressed.

Figure 13:
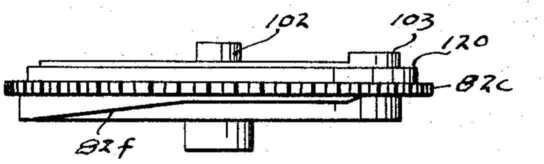
FIG. 13 is a side elevational view of the record change cycle cam gear.
Figure 15:
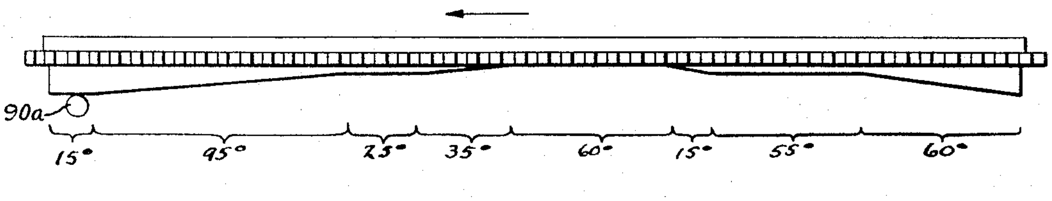
FIG. 15 is a developed or extended view of the record change cycle cam gear.

The tone arm is first lifted off the record but not high enough to hit the bottom of the stack. It then moves outwardly to one side of the stack and turntable. Next it is lifted opposite to the lowest record on the stack and then is moved in to contact that record. The exact raised position of the tone arm is controlled by the adjustment of the adjusting screw 28*g*. Next it is moved out and the record dropped; then it is moved back to the place where it will track the outer groove of the record and then lowered onto the record. It is apparent therefore that the cam must control the lifter and it in turn causes the tone arm to provide the vertical movements described. The position of the cam surface is clearly shown in FIGS. 13 and 14. For a better and more detailed understanding of its operation, reference may be had to FIG. 15 which is a developed view of the cam surface. It should be assumed that the cam surface is moving from right to left because the cam wheel moves in a clockwise direction as viewed from above. The lug 90*a* is shown in the center of a first dwell which extends for an arc of 15° of rotation. This is the position where the lifter had been lowered the maximum amount until it is out of contact with the tone arm, leaving it free to engage its needle or stylus with a record. At the start of the change cycle, a cam rise running for 95° of rotation allows the tone arm to rise sufficiently high that it may be moved off of the records that are on the turntable preparatory to swinging it outward, but not high enough to hit the bottom of the stack. The next arc of 25° is a dwell at which time the tone arm starts to swing outward. This is followed by a rise arc of 35° which causes the tone arm to rise to its maximum height at the end of its outward swing so that it is opposite the lower record on the stack. Then the higher dwell arc of 60° holds the tone arm up in its raised position while it is being swung in to engage the lowest record on the stack and then out to its position beyond the side of the turntable. Then there is an arc of 15° for lowering the tone arm where the tone arm is lowered to a position sufficiently low to miss the stack when it is swung in but high enough to also miss the records that may be on the turntable. This is followed by a dwell of 55° during which the tone arm is swung in to the record playing position over the start of a record groove, after which it is lowered by the arc of 60° to needle engagement with the record starting groove of a record on the turntable. It is held in this position while being lowered and the needle is engaging the leading groove. At some time prior to the reaching the end of the last-mentioned arc, the lifter is withdrawn from the tone arm and it is now free to track the record. The cam has now moved back to the lowest dwell, which is an arc of 15°, from which it started, where the cam is locked against movement.

The means for swinging the tone arm outward, in timed relation to its upward and downward movement, comprises a plurality of lands or cam tracks on the upper side of the cam gear 82 FIG. 26. As previously described, the tone arm shaft 20 carries a lever 70, below the plate 18 which has a cam follower pin 70*c* that cooperates with the lands to effect the proper movement.

During the record playing cycle this pin 70*c* is being moved within the area between the swing-out land 100 and a flange 101, from its outer position, which depends upon the size of record being played, toward the hub 102 of the gear as shown by the series of dotted circles 70*c*.

The path the pin takes is indicated by arrowed line A. When the change cycle starts, the gear starts to revolve in a clockwise direction, as indicated by the arrow. The tone arm is first raised by the rise during 95° of rotation. Then the land 100 engages with the follower pin 70$c$ and swings the lever 70 and hence the tone arm outward. In the interest of simplicity, this action will be described as if the gear were standing still and the pin 70$c$ moving in a counter-clockwise direction because the movement of the two is a relative one. Assuming that the pin was at the innermost position, its engagement by the land 100 causes it to be moved outward to the position 70$ca$ and the tone arm is now moved to one side of the turntable. This is the position shown in FIG. 18. It will be noted that the trip spring 71 engaged with the lug 75 which caused the spring to be set to the position required for engagement with the trip 76 as previously described. Between the position 70$ca$ and 70$cb$ the tone arm is then raised its maximum height opposite the lowermost record of the stack.

At this time the second lever 72 is about to be contacted on its outer edge 72$c$ by a land 103 of greater height than the other land, and, as the cam gear revolves it is contacted and the entire lever assembly on the tone arm shaft, along with tone arm, is moved inward until the tone arm engages with the lowermost record on the stack. Since the tone arm contacts with the lower record the lever 70 is stopped in its inward movement but the lever 72, due to its spring connection with the lever 70 is able to move under the bottom of the lever 70, the lug 72$a$ moving inward relative to and away from the pin 70$c$.

The follower 70$c$ is now approaching one of the lands 104 or 105, which have pointed ends. The exact positions of the follower pin will, of course, depend upon the size of record. These positions are indicated by 7″, 10″ and 12″ on the arc B. If the follower pin is at the 7″ position, it will engage with the land 105 on the radially inward side of the point and be guided into the channel 106. If it had been radially outward of the point on land 105, as shown at 10″ position, it would be guided into channel 107. If it was outward ofl and 104 in the 12″ position, it would have been guided to the outer side of land 104. It is pointed out that the relative movement between the levers 70 an 72 is dependent on the place where the tone arm is stopped in its inward movement by a record on the stack. In the case of a 7″ record, since the lever 70 can move in the maximum amount there is no relative movement and when a 12″ record is contacted the relative movement is greatest. Hence it can be seen that when the follower pin 70$c$ is in the track 106 it and the lever 70 can move freely radially between the walls of the track, but in the other tracks 107 and on the outside of land 104 the pin is held against the outer surface of the lands 105 or 104.

When the follower engages the outside of the point of lands 105 and 104, the pin 70$c$ is cammed outward a sufficient distance to move the lever 70 and hence the tone arm out beyond the edge of the particular record previously engaged by the tone arm a sufficient distance that the record clears the tone arm when it is ejected from the spindle shoulder. In the case of a 7″ record, the tone arm swings in its maximum amount but does not contact the record and there is therefore sufficient clearance that the record may be dropped without moving the tone arm outward.

Shortly after the pin 70$c$ passes beyond any one of the land points, the ejector slide is operated by the eject part 82$d$ of the cam track to cause the record to be dropped as previously described. The tone arm is now lowered to the level below the bottom record of the stack while the pin 70$c$ moves along the land. It will be recalled that the tone arm was to one side of the stack.

At this time the pin 70$c$ has arrived at one of the points indicated by the arc C of FIG. 26. The lands 104 and 105 curve inwardly at this point. As the follower pin moves beyond the point C they are carried inward, moving the tone arm inward until the points along the arc D are reached, at which time the tone arm is disposed with the needle over the starting groove of the record, be it 7, 10 or 12 inches. Between the points D and E, the point 72$c$ of lever 72 rides beyond the land 103 and returns to its normal position with the projection 72$a$ engaging with the pin 70$c$. The lateral control of the lever 70 and the tone arm is now by the engagement with the lands on opposite sides of the follower 70$c$, which are concentric with the center of the cam.

For 7″ records, the inner surface of land 105 and the outer surface of a land 108 control the tone arm. Likewise the outer and inner surfaces of lands 105 and 104 respectively control it for 10″ records and the outer and inner surfaces of lands 104 and 109 respectively control it for 12″ records.

At some point beyond points D where the tone arm has started to lower into position over the record, the needle contacts the starting groove of the record. The exact point where contact is made depends on the number of records that are on the turntable. If there was one record on the turntable, this contact would be approximately at the points of arc E. At the points of arc F the lifter 90$b$ moves down out of contact with the tone arm and its height adjusting screw. Obviously if more than one record was on the turntable the point of needle contact would have occurred sooner. Between points E and the ends of the land the needle of the tone arm is always engaged in the groove of a record and there can be no skidding of the tone arm and its needle across or off the record because it is still laterally controlled by the lands. The compliance of the needle is normally sufficient to enable a slightly lateral movement of the needle relative to the tone arm while the tone arm is still controlled. In any event, there is approximately only a maximum of two revolutions of the turntable at the highest speed (78). Then the follower rides out of contact of the lands to the points of arc A at which time the cam has been stopped or indexed.

As previously mentioned, means is provided to shut off the record changer after the last record has been played. It was pointed out that the stabilizer arm which was resting on the last record of the stack was released when that record was discharged and that the cross pin 43, together with the cam inside the stabilizer pedestal caused the arm to move out to one side of the turntable and that the shaft 41 and pin 43 moved down and engaged wih the shut off lever 110 (FIG. 19) and pivots it vertically about its pivot.

The pivot for the lever 110 includes a shouldered stud 111 having a head, which, by virtue of the shoulder, is disposed in spaced relation to the bottom of the removable base plate 18. The stud is held in place by a screw 111$a$ extending through the plate 18 and threaded into the shank. The shut-off lever has an opening through which the shoulder of the support extends freely.

On each side, from the mid-line of the support 111, the shut-off lever is bent at the mid-line so that the opposite ends extend downward slightly away from the base 18. At the mid-line the lever is provided with a pair of bosses 110$a$ which extend downward into engagement with the top side of the support head and provide fulcrum and bearing points for shut-off lever, allowing the opposite ends to tilt alternately vertically toward and away from the base. The lever may also swing about the pivot on the base. Between the pivot and the end of the lever is a downwardly extending follower pin 110$b$. At the opposite end the lever is formed with a downwardly extending lug 110$c$ to which a motor shut-off rod 112 is connected.

At the outer end of the shut-off lever 110, pivotally mounted on the base spaced from the end of the shut-off lever, is a tone arm latch or lock lever 113. This lever is a bell crank lever, one end **113*b* of which is provided with a downwardly extending curved flange 113*a* which engages with the end of the shut-off lever at the flange 110*c*. The lever 113 is loosely secured to the underside of the base by a shoulder support 114, held in place by a screw. The other arm 113*c* extends over in closely spaced relation but slightly beyond the end 70*a* of lever 70 and has on its end a downwardly extending flange 113*d***.

The shut-off lever 110 and the tone arm lock lever are held rotated clockwise, as viewed in FIG. 18, by a very lightweight spring 115, one end of which is hooked onto the follower pin **110*b*, the mid portion engaging with the shank of the shoulder support 111 and the other end hooked onto the flange 113*d* of the lock lever. The movement of the shut-off lever, clockwise, is limited by a lug 116 extending from the bottom of the plate 18**.

As can be seen, the end of the lever 110 bearing the flange **110*c* is heavier than the other end and normally the end bearing the follower 110*b* is in a raised position adjacent the underside of the plate 18**.

The motor shut-off rod 112 is offset at **112*a* and continues through a support 117 extending downward from the underside of the base 18. The extremity of this rod is provided with a downwardly extending portion 112*b* which, as will later appear, engages with and moves the idler support arm 60. A spring 118 is hooked between the offset 112*a* and an anchor 119 extending down from the base. The tension of the spring on the rod is transmitted to the shut-off lever 110 and supplements that of the spring 115. The shut-off lever 110** can be rotated counter-clockwise to two other positions as shown by the dashed lines.

When the record changer had previously been automatically shut off, the lever 110 had been tilted to the position shown in FIG. 19 and rotated counter-clockwise, from the position shown in FIG. 18 in full lines, to the extreme position shown in dotted lines where the latch lever 113 had been rotated by the springs 115 and 118 so that the end **113*d* had blocked the end 70*a* of the lever 70**, FIG. 18*a*, by virtue of the fact that the follower pin **110*b* was held down by the weight of the stabilizer arm and held out in its outer position by the pin being engaged with the outside edge of the ledge 120**, as indicated at M*a* on FIG. 26. When the records have been loaded on the spindle and the stabilizer arm is raised to be moved over into engagement with the top record, the upward movement of the stabilizer arm raises the shaft 41 and the pin 43 is raised off of the end of the shut-off lever 110 and this end moves upward due to the other end being heavier. The follower pin **110*b* then raises from out of engagement with the side of the ledge 120 and the lever 110** then moved it to position M*b*. The cooperation of the follower pin **110*b* with the cam gear will again be described as though the follower was moving and the gear stood still. At this time the springs 115 and 118 cause the shut-off lever 110 to be pivoted back to the position shown in FIG. 18. At this time the follower pin 110*b* is disposed over and clear of the ledge 120** in the position M*b*, in which position it remains so long as the stabilizer arm is engaged with a record on the spindle shoulder.

When the last record is finally discharged from the spindle shoulder, the weight of the stabilizer arm causes the shaft to move down and the pin 43 to operate the lever 110 to the position shown in FIG. 19, wherein the follower **110*b* now engages with and rests on the ledge 120**. This engagement occurs at the point M*c* which is approximately 180° from the point M*b*. The change cycle then continues to completion at which time the follower **110*b* is now resting on the ledge 120** at the place M*b*, where it remains until the last record has been played and the change cycle starts as previously described. Relative movement between the follower on the ledge causes the ledge to move under the follower until it reaches the end **120*a*** of the ledge where it drops off at M*d*. At this time the pin **110*b* has again been lowered below the ledge into the gap at the end 120*a* and opposite the cam surface 120*b*, of the ledge 120*c*, which is a continuation of the ledge 120 but is narrower, the outer surface being spaced radially inward of the outer surface of 120. Upon continued revolution of the cam gear, the rise 120*b* engages the pin 110*b* and rotates the shut-off lever 110 counter-clockwise through about one-half of its total capable movement. Lever 113 follows the movement and the end 113*b* moves into interfering position with the end tone arm lever 70. It will be understood the tone arm was over a record in the process of swinging outward and that the lever 70 was outward of the position shown in FIG. 18, hence when the lever 110 moved to its half way position, counter-clockwise the end 113*d* of the lever 113 engages with the curved edge of lever 70**, as illustrated in FIG. 18*b*. As the change cycle continues, the next thing that occurs in this part of the mechanism is the movement of the tone arm outward which causes the swing out lever end **70*a* to move past the end 113*d* of lever 113, which lever may move because of the resiliency of the spring 115 until it (70*a*) moves beyond the lug 113*d*, at which time the spring 115** moves the latch lever to the position shown in FIG. 18*a*. Thus the end **113*d* of the latch lever blocks or locks the lever 70 and holds the tone arm in its outermost position. The follower pin 70*c*, for the tone arm is therefore retained in its outer position and follows around and onto the outside of land 109**.

During the above time the follower **110*b* travels along the outside of the ledge 120*c* until it reaches the rise 120*d*. When it engages the rise the lever 110 is then moved outward to its extreme position which pushes the motor shut-off rod 112 with end 112*b* against the first idler support link 60. This causes the link 60 to be moved counter-clockwise, as viewed in FIG. 8, which disengages the idler from the motor shaft and causes the shut-off lug 60*b* to engage the operating pin 125 of a switch 125*a*** mounted below the base. This switch controls the circuit to the motor and the motor is shut off.

If at any time it is desired to start the change cycle before a record has been completely played, this can be effected by depressing a control knob 127 which extends on the upper end of a rod **127*a*, which is mounted for vertical movement in the flanges 55*a* and 55*b* of the speed shift bracket 55. The lower end of the rod 127*a* FIG. 17, has the upper end 80*a* of the eject link pivotally secured therein. A downwardy extending part 80*b* connects with the horizontal part 80. The lower extremity is formed with an angular offset 80*c* which extends down through the arm 78*c* in the cam support plate. The very extremity of the link may be provided with a laterally extending part 80*d* which hooks under the arm 78*c*. When the knob 127 is depressed the link 80 forces the gear support plate arm 78*c*** to the left, as viewed in FIG. 17, which causes the plate to be moved counter-clockwise as viewed in FIG. 16, and this starts the record change cycle which is the same cycle previously described.

As previously mentioned, the spindle is removable. As best shown in FIGS. 6 and 19 to 25 inclusive, a plate 130 is secured to the top of the well **10*b* over an opening 131. The plate has an upright bushing 132 secured therein. The bushing has a bore for receiving the end of the spindle, which may be inserted therein until it strikes the stop 133**, formed by lancing a lug from the bearing plate, which lug extends opposite the end of the spindle.

The bottom end of the spindle is milled away to provide cam surfaces **12*d* on one side and a notch 12*e* at the upper end of the cam surfaces. A keeper spring 134 is secured to the bottom of the plate. It is a U shaped spring having a bight end 134*a* which is offset and extends up through a slot 130*a* in the plate 130 and overhangs the top of the plate. The legs of the spring extend close to the other edge of the plate and are provided with offset outwardly extending toes 134***b* which are hooked through a slot 130*b* in the plate.

When the spindle is inserted, the cam surfaces 12*d* engage with one of the legs of the keeper spring and displace it, after which it snaps into the notch 12*e*. As stated, the downward movement of the spindle is limited by the lug 133. It can be quickly removed by turning it a quarter of a turn in either direction to rotate the notch out of engagement with the keeper after which it is withdrawn.

A leaf spring 136 secured to the bottom of the plate 130 has a toe 136*a* which engages with the end of the eject lever 84 to assist in holding the lever in the position shown and also holds the lever, which is capable of slight upward movement in its upper position. The operation of the lever within spindle and the manner in which the ejector releases a record from the shelf is well known in the art and need not be described.

The lever 84 is also held in the position shown by a spring having a pair of legs which extend upward on opposite sides of the lever. The upper ends of the legs 138*b* are frictionally engaged with the inside of the spindle tube 12 and then extend down to a part 138*a* which engages with the wall and acts as a fulcrum. The lower end is provided with a backwardly bent bight part 138*c* which engages with the lever 84 near the end.

An alternate form of automatic swing-out for the stabilizer arm is illustrated in FIG. 21*a*. In this instance the channels 44*x*, 44*y* and 44*z* within the pedestal correspond to channels 44*a*, 44*b* and 44*c* of FIG. 20. A molding problem occurs in the manufacture of a device such as illustrated in FIG. 20 in that because of the lower slanting channel 44*d* the mold cannot be parted and the lower swing-out channel 44*d* must be provided by some kind of an insert. To avoid this, the channel 44*d* is omitted and the shaft 41 is provided with a pin 43*x* above the pedestal at a fixed distance from the lower pin 43 which engages with a boss 42*x* which has a spiral cam surface 42*y* leading to a drop-off 42*z*. When the last record is released and the shaft starts to move down as the lower pin 43 leaves the channel 44*z*, the upper pin rides down on the cam surface 42*y* swinging the stabilizer arm the same as the slant surface 44*d* did in the other embodiment. When it reaches the end of the surface, it finally drops down beside the drop-off 44*z*; otherwise the operation is the same.

It is apparent that the above construction enables considerable savings in manufacturing costs because all of the assembly operations may be performed without turning the base over. All of the parts which cooperate with the tone arm and the stabilizer arm may be assembled from above. All of the parts on the plate 18 may be assembled and then, the subassembly so made, put in place on the base. Should any adjustments need to be made, or any parts replaced, it is a simple matter to remove the plate 18 and cure the defect.

Due to the fact that the change cycle is initiated by moving the latch lever 113 that lever may be made very light and easy to move, the effort required by the tone arm to effect the initiation of such change cycle is very small and therefore the amount of needle pressure in the record groove can be made very light, of the order of one-half gram, and therefore the record life is materially increased.

Since the turntable and most of the associated parts may be made of a suitable plastic, the cost thereof is greatly reduced and the changer made much lighter in weight. In addition, as previously mentioned, the use of plastic inhibits the generation of stray inductive or magnetic fields and allows reproduction without the introduction of alternating current noise.

Having thus described the invention in an embodiment thereof, I am aware that numerous and extensive departures may be made therefrom without departing from the spirit or scope of the invention as claimed in the appended claims.

I claim:

1. A record changer including a base, a turntable rotatably mounted on the base, a record supporting spindle mounted on the base and extending upwardly through the turntable and having a record stack holding portion and a means for releasing a record from said stack to fall on the turntable, a tone arm and a record stabilizer arm pivotally mounted to one side of the turntable, said tone arm and stabilizer having mounting shafts and a cam follower means disposed on the end of the tone arm shaft, the improvement which comprises a rotatable cam disposed below the base and having a plurality of cam surfaces thereon for swinging the tone arm outward and inward and means to rotate the cam under said follower means, said cam follower means comprising a first lever fixed on said mounting shaft and having a cam follower thereon, a second lever rotatably mounted on the shaft juxtaposed to the first lever and a spring connecting it to the first lever, said second lever having a portion engaged with the first lever to limit the relative movement therebetween in one direction, said cam having a first cam surface extending in the path of travel of the second lever for moving the second lever and the first lever in unison and with the tone arm into engagement with a record on said stack, a second cam surface disposed in the path of travel of the follower and arranged to receive the follower and hold it against radial movement relative to the first lever after the tone arm has engaged said record and said second lever being moved by its cam surface relative to the first lever, said second cam surface having a third continuation thereof disposed radially inward from the first portion and moving the follower and its lever together with the tone arm inward over the beginning of a record, said first cam surface arranged to release said second lever after the follower enters the cam track.

2. A device as described in claim 1, wherein said cam wheel has separate cam tracks for different sized records.

3. A device as described in claim 2, wherein said cam wheel is provided with an additional cam surface and means disposed between said cam surface and said tone arm raising and lowering said tone arm in timed relation to the inward and outward swinging movements of the tone arm.

4. A device as described in claim 3, wherein a record ejecting cam surface is provided on said cam wheel and means is provided connected between the cam surface and said spindle means for operating said record releasing means, said last cam surface arranged to operate said connecting means in timed relation to the outward and inward swinging of the tone arm.

5. A record changer having a base, a turntable rotatably mounted on the base, a spindle means extending from the center of the turntable for supporting a stack of records and releasing them singly onto the turntable, a tone arm mounted to one side of the turntable for swinging and vertical movements and a stabilizer arm mounted at the side of the turntable for vertical and horizontal movements, the improvement which comprises means for raising, lowering and swinging the tone arm in timed relation including a motor driven cam wheel disposed below the mounting for the stabilizer and tone arm, said cam wheel having a first cam surface on its underside for raising and lowering the tone arm and actuator means connecting the cam surface and the arm and a second cam surface on the underside for ejecting a record from the spindle and means connecting said cam surface and said spindle, and cam surfaces on top of said cam wheel for swinging said tone arm toward and away from said spindle and means connecting said top cam surfaces to said tone arm comprising a vertically mounted member having a follower arm disposed under and in contact with the cam and spring means for holding the member with the follower arm against the cam.

6. A device as described in claim 5, wherein said member is provided with an arcuate tone arm engaging portion extending upward through the base and the tone arm has a height adjusting screw connected to the tone arm and extending opposite said arcuate tone arm engaging portion.

7. A device as described in claim 6, wherein said tone arm is pivotally mounted on the upper end of a shaft and a cam follower member is provided on the lower end of the shaft having a cam follower in engagement with the cams on said cam wheel.

8. A device as described in claim 7, wherein said stabilizer arm is mounted on a vertically reciprocable shaft which extends below the base and a shut-off lever is pivotally mounted below the base and has a cam follower with said cam follower disposed for engagement with said cam wheel and being pressed into engagement with the cam wheel when the stabilizer shaft moves down to a predetermined level.

9. A record player comprising a base, a turntable rotatably mounted on the base and a tone arm supported on the base to one side of the turntable for vertical and horizontal swinging movement, means to swing the tone arm horizontally disposed under the base and including a rotatable cam means, said support for the tone arm including a shaft connected to the tone arm and extending below the base, a follower lever connected to the shaft below the base and having a follower pin in engagement with said cam means for rotating said shaft, a second lever swingably mounted on said shaft juxtaposed to said follower lever and movable relative to said follower lever, and having a portion extending opposite to and in engagement with said follower pin, spring means connecting the second lever to the follower lever and resiliently holding the second lever with said portion in engagement with the follower pin, said cam means having a plurality of lands thereon cooperating with said follower to swing said lever to predetermined positions, a cam surface on said cam for engagement with said second lever to move it relative to the follower lever and set up a resilient pressure on the follower lever.

10. A record player comprising a base, a turntable rotatably mounted on the base and a tone arm with a pickup having a record engaging stylus pivotally mounted for vertical and swinging movement on a shaft extending below the base, means for holding a stack of records each having a starting groove in spaced relation to the turntable above the turntable and for releasing the bottommost record from the stack and guiding it onto the turntable, a cam follower lever rigidly connected to said shaft and having a cam follower thereon, a lost motion member pivotally mounted on the shaft juxtaposed to the follower lever and having a portion in abutting engagement with the follower lever and another portion extending free of the follower lever and resilient means holding the lost motion member with the portion abutting the follower, a rotatable cam member disposed below the follower and lost motion member and having an upwardly extending lost motion cam surface for engagement with the portion of the lost motion member which extends free of the follower, a plurality of cam lands for engagement with the follower including a first cam surface engaging the follower and swinging the follower and tone arm outward, said lost motion cam engaging with the lost motion member to move the follower lever and lost motion member inward and with the tone arm into contact with a record on said stack, to stop the tone arm and follower in their inward movement, said lost motion member being moved relative to the follower lever by virtue of the spring and to cause a spring tension of the follower lever, at least one of said lands having slanting surfaces on its end in the path of travel of the follower and engaging with the follower and moving the tone arm outward out of contact with the lever, means engaged with the tone arm to raise and lower the tone arm in timed relation to the swinging movement of the tone arm, said lands having a curved portion beyond the slanting ends to move the follower inward and the tone arm over the starting groove of a record and to hold the needle of the tone arm over the starting groove for a predetermined distance, said lost motion cam terminating after the follower is engaged by said lands to hold the tone arm over the starting groove and said lost motion member moving back into position with said follower lever, said lands terminating at a point relative to the follower before the follower stops and leaving the follower free to move and the tone arm needle to track a record in the record groove.

11. A record player including a base having a tone arm supported at one side of the base and a turntable for supporting and rotating records to be played, said tone arm being pivotally mounted on the base to one side of the turntable and movable by virtue of the pivot vertically and horizontally, means to raise said tone arm comprising a rotatable cam member supported below the base, said cam member having a cam surface extending coaxial with the axis of the cam and having portions of different height, a lifter supported for vertical reciprocation below the base and having a portion for engagement with the tone arm and a follower part engaged with said cam surface, said cam surface arranged to raise said lifter and said lifter to raise said tone arm.

12. A device as described in claim 11, wherein the tone arm is provided with a height adjusting screw in engagement with said lifter.

13. A device as described in claim 11, wherein said cam surface includes at least one surface arranged to engage with said lifter and withdraw it from contact with the tone arm to leave said tone arm free.

14. A device as described in claim 11, wherein said cam surface includes one surface that lowers the lifter out of contact with the tone arm, another surface which raises the tone arm to its one positional height and another surface which raises it to another positional height.

15. A device as described in claim 11, wherein said cam surface is on the underside of said cam member and spring means is engaged with said lifter and holds said follower against said cam surface.

16. A device as described in claim 15, wherein said spring is arranged to be compressed when pressure is placed on said tone arm from above the tone arm.

17. A device as described in claim 15, wherein the portion which engages the tone arm is of arcuate formation and has a flat upper surface disposed under the tone arm and the radius of the arc is the same as the radius from its point of contact with the tone arm to the pivot for the tone arm.

18. A device as described in claim 17, wherein said base is formed with a curved slot and said curved portion of said lifter is reciprocable in said slot.

19. A record changer including a base and a turntable rotatably mounted on the base and means to support a stack of records over the turntable and release them singly onto the turntable, a tone arm, a first shaft carrying the tone arm at its upper end above the base and a cam engaging lever at its lower end below the base and means for engagement with the top record of the stack including a record engaging member, a pedestal and a second shaft connected to said member and extending through the pedestal below the base, means to shut off the record changer when the last record has been played including a shut-off lever pivotally supported by the base and having an end disposed below said base and arranged to be engaged by said second shaft and having a cam follower thereon, a latch lever pivotally supported by the base at the other end of the shut-off lever and having one end for engagement with the end of the shut-off lever and another end for engagement with said cam lever, spring means connected between the shut-off lever and the latch lever biasing the latch lever into contact with the shut-off lever, a rotatable cam means carried by said base below the cam engaging lever and the shut-off lever and arranged to rotate one revolution for each complete record change cycle and having a plurality of cam surface thereon including a first cam surface disposed under the shut-off lever arranged to be engaged by said cam follower connected to said cam to drive the cam and having a control switch, said follower being disposed over said cam surface out of contact therewith when the record engaging means is in engagement with a record and being forced into contact with said cam surface when the last record is dropped from said stack, said cam surface extending coaxial with the axis of said cam means and having a depression thereon for receiving said follower upon partial revolution of the cam during a record change cycle and an outwardly extending rise engaging and moving said follower outward and to swing the shut-off lever about its pivot, said spring means biasing said latch with its tone arm follower means into engagement with said tone arm lever to hold the tone arm against swing movement.

20. A device as described in claim 19, wherein a rod is connected to said shut-off lever and extends to said switch means to operate said switch means.

21. A record changer including a base, a turntable rotatably mounted on the base, an eccentric boss at the axis of the turntable, a pitman having one end journalled on the boss and slidably secured to the base intermediate its ends and having a trip engaging hook on its end, a tone arm mounted on the base to one side of the turntable for swinging movement and having a needle for tracking a groove in a record, said tone arm mounting including a shaft connected to the tone arm and extending below the base, a trip spring member frictionally connected to the lower end of the shaft, a support plate pivotally supported below the base for limited movement, a record change cycle cam gear rotatably supported on said plate, an idler having a pinion in mesh with said gear and a peripheral friction surface rotatably supported on said plate, a motor having a shaft and said friction surface of the idler being disposed spaced from the shaft, a trip lever pivotally mounted on said support plate and having a pitman hook engaging arm and a trip spring engaging arm, said pitman being continuously driven by the eccentric on the turntable and partaking of an orbital movement opposite said trip lever, said trip spring on the tone arm shaft having a portion engaging the trip engaging arm of the trip lever and moving the trip lever as the tone arm tracks a record groove toward said hook end of the pitman, said trip lever hook engaging arm having a first cam surface on its outer edge and a second pitman hook engaging surface inward from the cam surface, said cam surface arranged to be engaged by the pitman hook end when the needle of the tone arm is tracking the sound groove of a record and said hook engaging surface arranged to engage the pitman hook when the trip lever is moved a greater amount as by the runout groove of a record, said pitman upon engagement with the trip lever hooking onto the trip lever and pulling the trip lever and its support plate with the idler into driving engagement with the motor shaft.

22. A device as described in claim 21, wherein the cam gear is provided with a cam track having a notch, and an epector slide is supported in cooperative relation to the cam gear and has a follower engaged in the cam track, said support plate having an arm extending near said slide, said arm having a narrow portion connected to a wider portion and the point of connection defining a rise, said follower member on the slide being disposed at said rise and in said notch, and upon rotation of the cam gear rotating the slide and the follower to the high position of said arm to hold the support plate with the idler in driving relation with the motor for one complete revolution of the gear.

23. A record changer including a base having a turntable rotatably mounted thereon and a spindle for supporting and guiding records to the turntable removably supported at the center of the turntable, a tone arm having a pickup for playing records and a stabilizer arm movably mounted to one side of the turntable, the improvement which comprises a separable base portion removably mounted on the base to one side of the turntable, said tone arm and stabilizer arm being carried by said removable base portion and having associated operating parts disposed below the base and all removable as a unit from said base; a tone arm control mechanism carried by said base below said tone arm and arranged to be engaged by said parts associated with the tone arm when the separable portion is placed on the base.

24. An apparatus as described in claim 23, wherein means is carried by said base disposed below the parts associated with said stabilizer arm and engageable with said parts to control said record changing mechanism to shut off the record changer when the stabilizer arm drops to a predetermined position.

25. An apparatus as described in claim 24, wherein said separable base portion is provided with an upstanding housing and a speed shift lever is mounted on the base and has a control arm extending upward through the housing.

26. In a record changer which includes a turntable for rotating a record and a record supporting spindle having an offset upper portion to provide a shoulder for supporting a stack of records above the turntable and having means within the spindle for pushing the records off said shoulder one at a time and means for operating said record releasing means, the improvement which comprises a guide socket at the center of the turntable, said spindle having at least a lower portion of circular cross-section and formed with a notch spaced from the end which extends along a cord and being slidable into said socket and spring means below the turntable for entering into and engaging with the bottom wall of the notch of the spindle to hold the spindle in only one rotational position for engagement by said releasing means.

27. A device as described in claim 26, wherein the wall of the spindle at the end is removed extending from the end of the spindle and intersecting said notch on the same side as the notch to provide a cam surface for engagement with said spring means.

28. A device as described in claim 27, wherein stop means is provided extending under said socket opposite to the end of said spindle in engagement with the edge of the spindle to limit the downward movement of the spindle.

References Cited by the Examiner

UNITED STATES PATENTS

| | | | |
|---|---|---|---|
| 2,764,415 | 9/1956 | Carlson | 274—10 |
| 2,965,377 | 12/1960 | De Boer | 274—15 |
| 3,010,724 | 11/1961 | Hansen | 274—10 |
| 3,023,009 | 2/1962 | Dale | 274—10 |
| 3,095,199 | 6/1963 | Lane | 274—10 |
| 3,162,449 | 12/1964 | Hansen | 274—10 |

NORTON ANSHER, *Primary Examiner.*

JOHN M. HORAN, *Examiner.*

J. F. PETERS, *Assistant Examiner.*